May 15, 1923.
D. SINCLAIR
1,455,675
EXTENSION PEDAL PAD FOR AUTOMOBILES AND SIMILAR MOTOR DRIVEN VEHICLES
Filed April 18, 1922
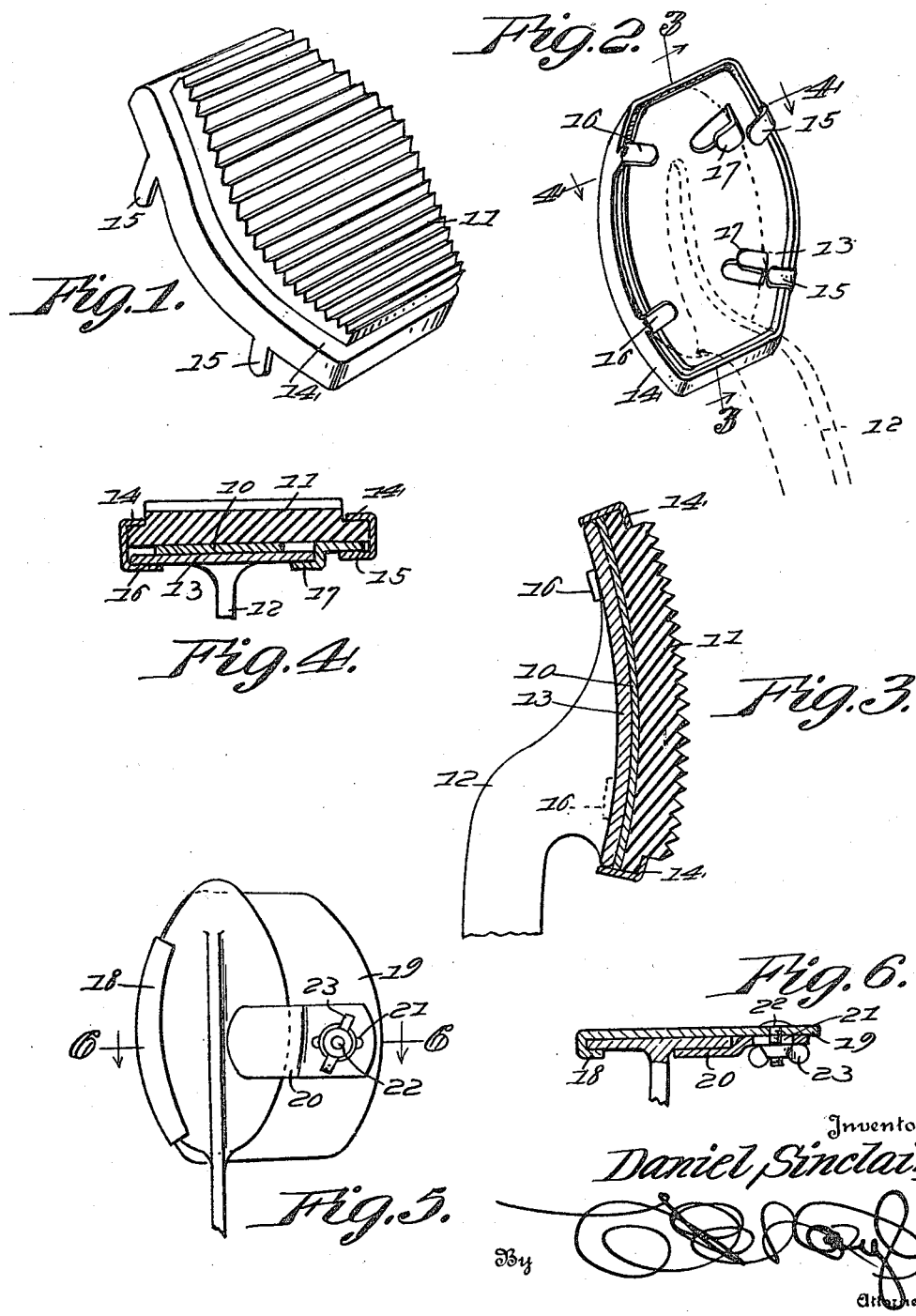

Patented May 15, 1923.

1,455,675

UNITED STATES PATENT OFFICE.

DANIEL SINCLAIR, OF NEW YORK, N. Y.

EXTENSION PEDAL PAD FOR AUTOMOBILES AND SIMILAR MOTOR-DRIVEN VEHICLES.

Application filed April 18, 1922. Serial No. 554,977.

*To all whom it may concern:*

Be it known that I, DANIEL SINCLAIR, a citizen of the United States, residing at New York, in the county of New York and State of New York (post-office address 318–320 West Fifty-second Street, New York, N. Y.), have invented a new and useful Extension Pedal Pad for Automobiles and Similar Motor-Driven Vehicles, of which the following is a specification.

The object in view is to provide a pedal pad, applicable to the pedal foot rests or heads of automobiles, particularly of the Ford and analogous types, for affording a more comfortable and secure bearing or rest for the foot, to minimize the tendency of the foot to slip off of and release the pedal to laterally increase the foot bearing surface or area, and to facilitate the location of the pedal and the positioning of the foot thereon, and furthermore, to provide a pad of the indicated type which can be substantially, easily and quickly attached to the rest or head of a pedal of the commercial or approved type, without involving any change in or preparation of the pedal, and which upon removal therefrom leaves the pedal in its original condition; and with these general objects in view, together with others of incidental character which will appear hereinafter, the invention consists in a construction, combination and relation of features and agencies disclosed in the following description and the accompanying drawing, illustrating typical embodiments; it being understood that changes in form, size, proportions and details of construction may be resorted to within the scope of the appended claims without departing from the spirit of the invention.

In the drawings:

Figure 1 is a view of the pad applied to a pedal of conventional form.

Fig. 2 shows the reverse or under side of the same pad, unattached, but with the position of the pedal indicated in dotted lines.

Figs. 3 and 4 are longitudinal and transverse sectional views of the pad.

Figs. 5 and 6 are rear and sectional views, respectively, of a modified form of the pad, with particular reference to the means for securing it to the pedal.

The preferred form of pad, shown in Figs. 1 to 4, inclusive, contemplates a base or bearing plate 10, adapted to carry a cushion or friction member 11 and provided with means for engagement with a pedal 12 of the type having a substantially elliptical or forwardly and rearwardly elongated head or footrest 13, used generally on Ford and similar makes of motor-cars.

It is expedient to simplify and minimize the number of parts of an attachment of this character, which is designed to be marketed as an accessory, not only as a means of reducing cost and increasing durability, but to facilitate assembly of the parts and attachment to the pedal, and to this end the cushion holding rim 14 which is cross-sectionally angular to form an interior seat, accessible from the rear or under side, for the rabbeted edge of the cushion, carries lateral rearwardly directed pliable tongues, of preferably integral construction (to permit of formation with the rim by stamping),—a pair of such tongues 15, arranged at one side being utilized to overlap and engage the base or bearing plate and hold it within the space bounded by the rim, and a similar pair of said tongues, 16, at the opposite side being designed and adapted to serve in complementary relation with tongues 17 preferably upstruck from the base or bearing plate in engagement with opposite side edges of the pedal head or foot-rest.

The rim and base or bearing plate being adapted for construction by stamping, the cushion may be inserted into the former from the rear thereof and held seated by turning the tongues 15 down on the bearing plate to hold the parts assembled until applied to a pedal, whereupon the bending inward of the tongues 16 will complete the structure.

This general structure may be modified, as indicated in Figs. 5 and 6 by providing a permanently inturned tongue or clip 18 at one edge of the bearing plate 19 and an adjustable clip 20, slotted as at 21 and engaged by a bolt 22 and thumb-nut 23, for engagement with the other edge of the pedal head or rest. In each form there is embodied the element of simplicity of construction and facility of attachment, with the advantage in the first form that the cushion, which may consist of rubber, not only provides a yielding frictional bearing for the foot but serves to hold the parts assembled both before and after application to the pedal and to clamp the head of the pedal in its engagement with the tongues or clips 16.

In both structures the pad conforms to the curvature of the head and affords a continuous bearing for the outer edge thereof, so as to provide against turning or twisting movement and hence tendency to looseness.

I claim:

1. An extension pad having a rim forming a seat for a surface cushion, a bearing plate fitted in the rim in contact with the rear surface of the cushion, and means for securing the rim and plate to a pedal.

2. An extension pad having a rim forming a seat for a surface cushion, a bearing plate fitted in the rim in contact with the rear surface of the cushion, rearwardly directed, pliable tongues on the sides of the rim and outwardly directed tongues on the bearing plate.

3. An extension pad having a rim forming a seat for a surface cushion, a bearing plate fitted in the rim in contact with the rear surface of the cushion, said bearing plate having laterally directed tongues for engaging one edge of a pedal head and the rim having at one side rearwardly directed pliable tongues for engagement with the bearing plate, and at the other side with similar tongues for engagement with the other edge of said pedal head.

4. An extension pad having a rim forming a seat for a surface cushion, a bearing plate fitted in the rim in contact with the rear surface of the cushion, said bearing plate having laterally directed tongues for engaging one edge of a pedal head and the rim having at one side rearwardly directed pliable tongues for engagement with the bearing plate, and at the other side with similar tongue for engagement with the other edge of said pedal head, the rim being cross-sectionally angular to form a seat for the rabbeted edge of said cushion.

DANIEL SINCLAIR.